Dec. 13, 1927.
E. S. ENSIGN
1,652,773
CONTACTING DEVICE
Filed Oct. 20, 1925
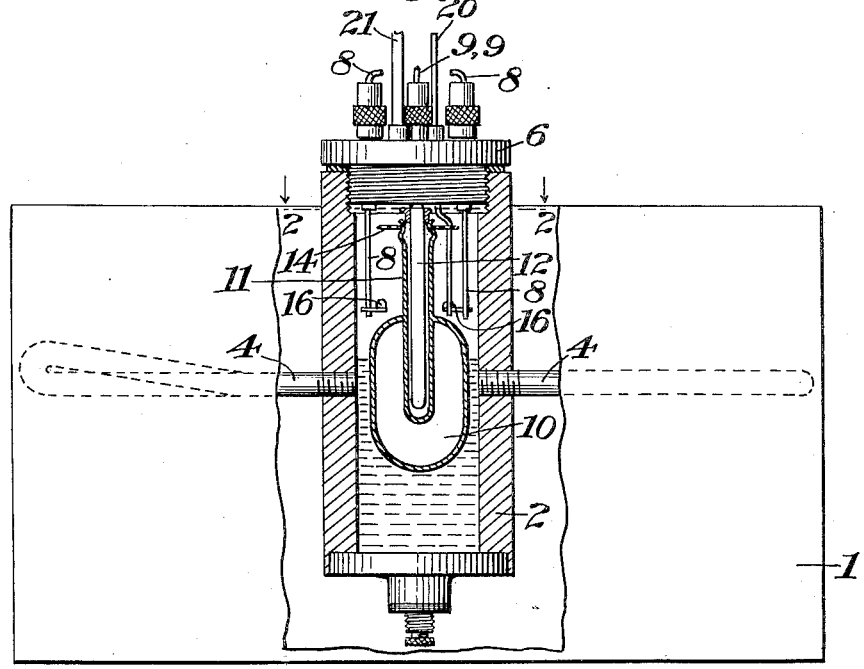
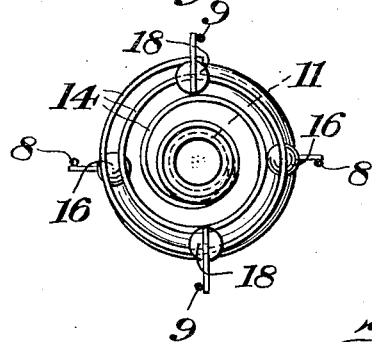
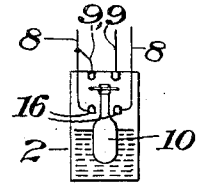
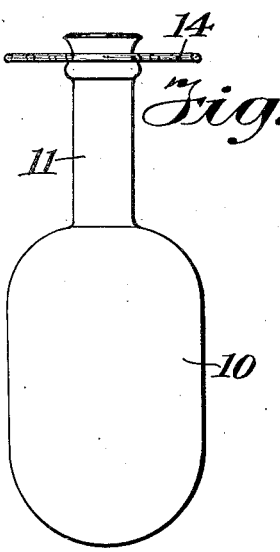
INVENTOR
Emory S. Ensign
BY
Cooper Kerr & Dunham
ATTORNEY Patented Dec. 13, 1927.

1,652,773

UNITED STATES PATENT OFFICE.

EMORY S. ENSIGN, OF BROOKLINE, MASSACHUSETTS, ASSIGNOR, BY MESNE ASSIGNMENTS, TO NATIONAL REFRIGERATING COMPANY, OF BOSTON, MASSACHUSETTS, A CORPORATION OF MASSACHUSETTS.

CONTACTING DEVICE.

Application filed October 20, 1925. Serial No. 63,699.

The present invention relates to refrigeration chambers or coils having a part for holding a pool of liquid refrigerant and a float for said pool which carries a contactor member adapted at given levels of the liquid in the pool to bridge given sets of contacts for use in connection with electrical circuits which are parts of apparatus for passing liquid refrigerant to the pool and for causing the withdrawal of it therefrom as, for example, set forth in the Keyes copending application, Serial No. 673,931, filed November 10, 1923. The invention more particularly relates to a contactor member in the form and shape of a conducting spiral resilient coil of wire or ribbon which is adapted to be moved against contact members and to flex to insure contact with one or more thereof and to insure electrical connection with the contacts of different sets. The spiral contactor of this invention is also adapted for use generally in the arts.

In the drawings used to illustrate the invention and which show more or less diagrammatically a refrigerator chamber with a refrigerant collecting pool and refrigerating coils, a float in the pool and a spiral contactor member carried thereby adapted to bridge one set of contact at a given upper level of the liquid pool and to bridge another set at a lower level:

Fig. 1 is a vertical elevation in part section of the refrigerant pool, float, contactor, and contacts.

Fig. 2 is a section view along the line 2—2 looking in the direction of the arrows showing in plan the float, the contactor, and the two sets of contacts.

Fig. 3 is an elevation view of the float and the spiral contactor thereon, and

Fig. 4 is a diagram of the electrical connections in the refrigeration chamber.

In the drawings the refrigerator chamber 1 has a refrigerant receiving container 2 which carries the refrigerating coils 4, 4 connecting therewith. The top cover member 6 screws into chamber 2 and carries the two sets of electrical conductors 8, 8 and 9, 9 which extend therethrough and are insulated therefrom. In the chamber 2 is the float 10 which extends vertically therein and which carries the vertical guide tube 11 which rides over the guide rod 12 fixed to the bottom of cover 6 as the float rises or lowers in the chamber 2.

Said tube 11, near its upper end, carries a flat helix 14 of more or less resilient metal wire or ribbon which extends in a plane substantially at right angles to the movement of the float. Within chamber 2 said conductors 8, 8 carry the inwardly extending contacts 16, 16 which are adapted to be bridged by said contactor 14 at a given lower level of the float 10. Below the contactor 14 the conductors 9, 9 terminate in the contacts 18, 18, the conductors 9, 9 and contacts 18, 18 being angularly displaced about 90° from conductors 8, 8 and contacts 16, 16 to provide proper insulating conditions. The tube 20 opening into chamber 2 may be used to carry liquid refrigerant to that chamber and the tube 21 opening therefrom may be used for reducing the pressure in chamber 2 and for withdrawing vaporized refrigerant therefrom.

The contacts 16, 16, and 18, 18, are preferably of graphite and are more or less hemispherical at the contacting end. By virtue of this construction, the flexing spiral member 14 actuated by the float 10, is forced to conform turn by turn with the contour of contacts 16, 16, 18, 18, thus insuring good ultimate conditions of one or the other turns of the spiral forced into contact therewith. It will be apparent, then, that if the first spiral does not close the circuit the further movement of the float will force other turns of the spiral into contact with 16, 16, or 18, 18, until the desired contact is secured, the spirals during this period dragging or rubbing the surfaces of the contacts 16, 18, as the float continues to rise or fall until electrical contact is accomplished.

While I have shown and described and have pointed out in the annexed claims certain novel features of the invention, it will be understood that various omissions, substitutions and changes in the forms and details of the device illustrated and in its operation may be made by those skilled in the art without departing from the spirit of the invention.

What I claim is:

1. In combination with a device having liquid therein at varying levels and electrical contacts to be closed at given levels, a float and a spiral coil contact or movable by said float and adapted at given liquid level for bridging said contacts and to flex to insure good contact therewith at a multiplicity of points thereon.

2. In combination with a device having liquid therein at varying levels and electrical contacts to be closed at given levels, a float and a spiral coil contactor movable by said float and adapted at given liquid level for bridging said contacts and to flex and conform while rubbing thereon to the configuration of the contact to insure good contact therewith at a multiplicity of points thereon.

3. In combination with electrical contacts in sets angularly displaced with respect to each other and in different planes, a contactor member comprising a spiral coil mounted between said sets of contacts and movable from one set to the other for contact therewith and contacting thereon at a multiplicity of points.

4. In combination, a refrigerator chamber adapted to receive a refrigerant therein in the liquid state and to hold it therein at varying levels, electrical contacts in sets adapted to be bridged at given levels of the liquid, a float in the chamber adapted to be raised and lowered by said liquid, and a spiral coil contactor member moved by said float and adapted to bridge the contacts of the said sets at various levels of said liquid and slidingly contacting therewith at a multiplicity of points.

5. In combination, a refrigerator chamber adapted to receive a refrigerant therein in the liquid state and to hold it therein at varying levels, electrical contacts in sets adapted to be bridged at given levels of the liquid, a float in the chamber adapted to be raised and lowered by said liquid, and a substantially flat spiral coil contactor member carried by said float and adapted to bridge the contacts of the said sets at various levels of said liquid even though all of the contacts of any one set of contacts be not located in a plane parallel to the substantially flat plane of said contactor.

6. In combination, a refrigerator chamber adapted to receive a refrigerant in the liquid state and to hold it therein at varying levels, electrical contacts in sets angularly displaced with respect to each other and at different levels, a float in said chamber adapted to be raised and lowered by said liquid, and a contactor in the form of a flat resilient spiral mounted to said float and adapted to bridge the various sets of contacts at given respective levels of the liquid and slidingly contacting therewith at a multiplicity of points.

7. In combination with a chamber adapted to contain liquid at varying levels, a float, a spiral contactor mounted on said float at its central portion, and a plurality of contacts disposed within the path of travel of said contactor, each contact having a projected dimension of contact surface of greater measurement than the spaced distance of at least two adjacent convolutions of said spiral contactor whereby a plurality of convolutions of said spiral contactor will rub against each of said contacts when the contactor is brought against said contacts.

8. In combination with a chamber adapted to contain liquid at varying levels, a plurality of electrical contacts at a predetermined level in said chamber, a float, and a spiral contactor carried by said float, said spiral contactor being normally flat and sufficiently flexible to insure adjacent convolutions thereof to flex and conform with said contacts when brought into contact therewith.

In testimony whereof I hereto affix my signature.

EMORY S. ENSIGN.